H. N. TUGGLE.
GENERATOR AND MAGNETO BEARING PULLER.
APPLICATION FILED AUG. 11, 1920.
1,426,126.
Patented Aug. 15, 1922.
3 SHEETS—SHEET 1.
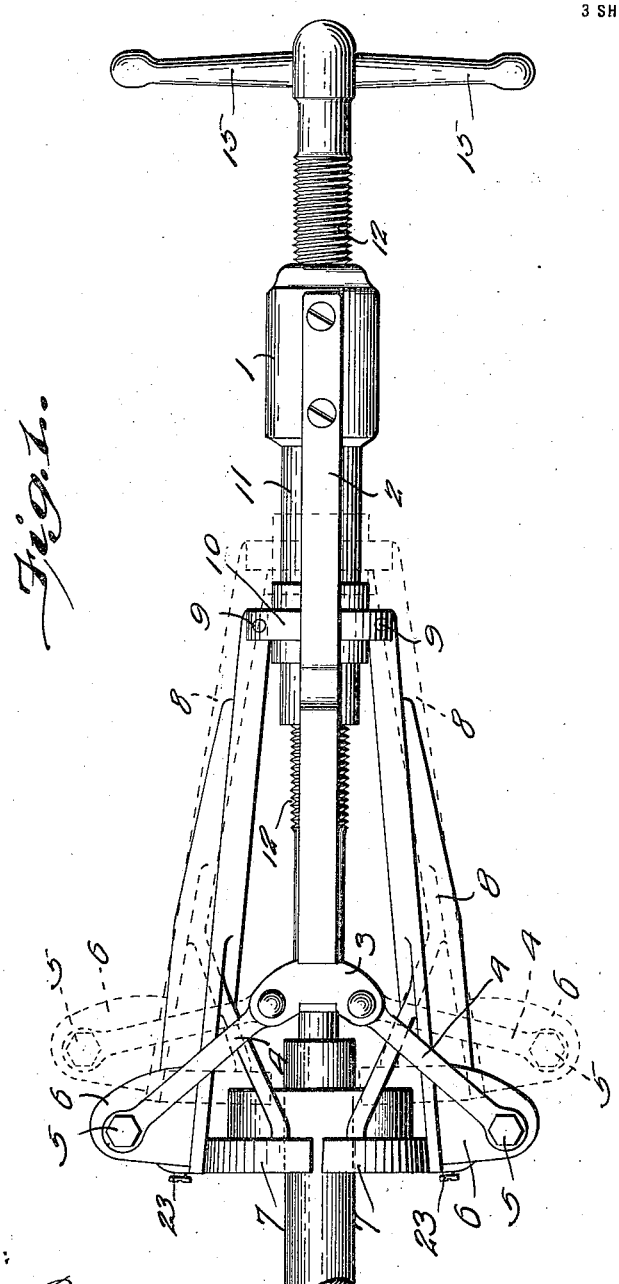

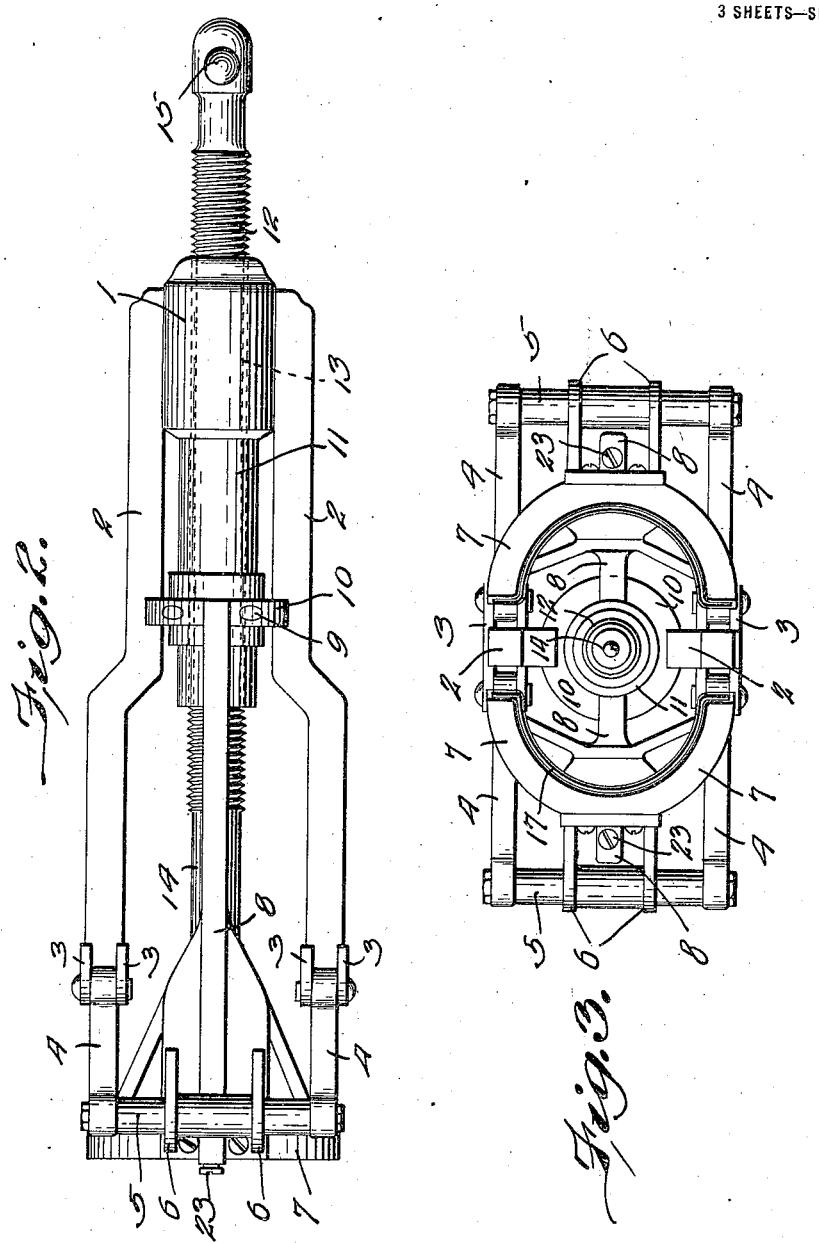

H. N. TUGGLE.
GENERATOR AND MAGNETO BEARING PULLER.
APPLICATION FILED AUG. 11, 1920.
1,426,126.
Patented Aug. 15, 1922.
3 SHEETS—SHEET 3.
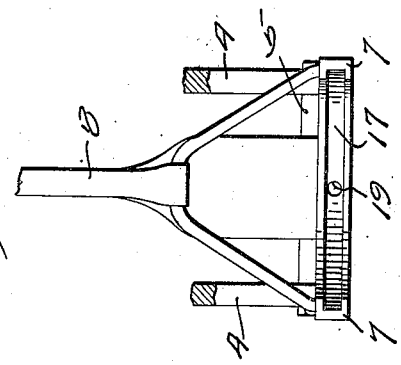
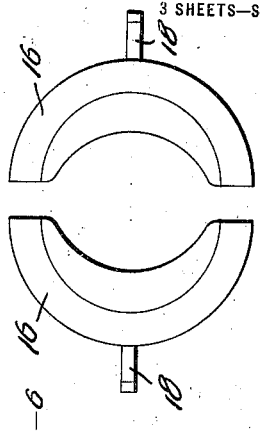
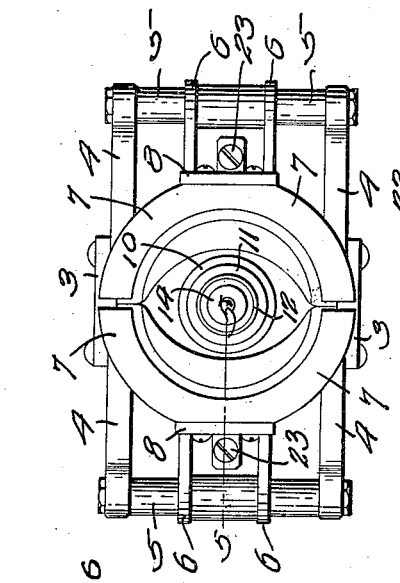
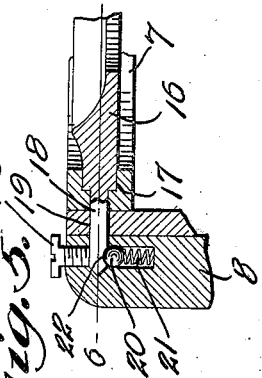
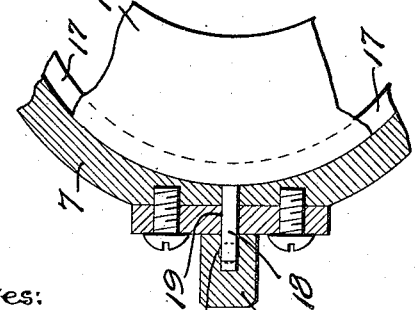
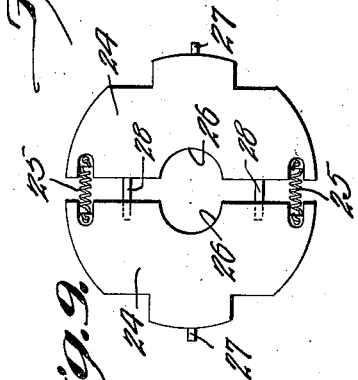
Witnesses:
Inventor
Henry N. Tuggle
By Hy W. Stackpole
Attorn

UNITED STATES PATENT OFFICE.

HENRY N. TUGGLE, OF CLAY CENTER, KANSAS.

GENERATOR AND MAGNETO BEARING PULLER.

1,426,126.  Specification of Letters Patent.  Patented Aug. 15, 1922.

Application filed August 11, 1920. Serial No. 402,865.

*To all whom it may concern:*

Be it known that I, HENRY N. TUGGLE, a citizen of Great Britain, residing at Clay Center, in the county of Clay and State of Kansas, have invented certain new and useful Improvements in Generator and Magneto Bearing Pullers, of which the following is a specification.

My invention relates to bearing pullers for extracting the bearings and cones from internal combustion engine generators and magnetos, and the object is to provide a tool by means of which such bearings may be extracted without destroying them or the armature shaft.

I attain this object by means of the mechanism hereinafter described and illustrated in the accompanying drawings, in which,—

Figure 1 is a view of a side elevation of my device closed, the dotted lines illustrating the position of the parts when open;

Figure 2, an edge view of same;

Figure 3, a bottom view thereof, open;

Figure 4, a bottom view thereof, closed and with a disc or chuck held therein;

Figure 5, a detail sectional view on the line 5—5 of Figure 4 of the manner of holding the disc or chuck from dropping out when the device is open;

Figure 6, a cross sectional view of same on the line 6—6 of Figure 5;

Figure 7, a side view of the lower portion of my device;

Figure 8, a detail view of one form of chuck;

Figure 9, a detail view of another form of chuck.

Similar numerals of reference indicate like parts throughout the several views.

On each side of the main bearing sleeve 1 are secured arms 2 connected at the lower ends with toggle-joint heads 3 to which are pivoted toggle-levers 4, their opposite ends pivotally attached to the opposite ends of shafts 5 supported by ears 6 secured to levers 8 which are pivoted at 9 to annular collar 10 sliding on extension 11 of sleeve 1. To the lower ends of levers 8 are secured the jaws 7 which are opened and closed by means of the screw-threaded shaft 12 operating by engagement of the screw-threaded interior 13 of sleeve 1, this operation causing the toggle-levers 4 to expand or contract and thus open or close the jaws 7; the pressure bearing end 14 of shaft 12 is operated by means of handle bars 15, or in any other well known manner.

To operate this device a chuck is placed between the jaws 7 and caused to grip the recess of the ball-race or placed behind the object to be removed and the pressure screw 14 screwed down till it bears against the end of the armature shaft, when a further gentle turn of the shaft 12 draws outward on the toggle-joint heads 3, thus contracting the toggle-levers 4 and drawing the ball-race from its seat.

The disc or chuck 16 is placed in the circular recess 17 in jaws 7 and pins 18 inserted in the holes 19 and held in place by the balls 20 forced into recess 22 in pin 18 by spring 21 and adjusting the pressure on such pin by means of set screw 23.

Various chucks may be used as needed. One for pulling cones or inner ball-races is shown in Figure 9, provided with central opening 26 and with plates 24 held in relative position by means of springs 25 and pins 28; pins 27 being placed between jaws 7 are gripped by them and serve to hold the chuck in position in the puller.

Having thus described by invention, what I claim as new and desire to secure by Letters Patent is:—

1. A tool of the class described, comprising a main threaded shaft, a sleeve traveling thereon, arms secured to said sleeve, an annular collar sliding on said sleeve, levers pivotally attached to said collar, toggle-joint-heads connected to said arms, toggle-levers attached to said first named levers and pivotally secured to said heads, a shaft connecting each pair of said toggle-joints, a chuck, jaws for the reception of said chuck therebetween, said jaws being secured to said first named levers and attached to said arms by means of said toggle-levers, and means for actuating said jaws for the purpose of gripping said chuck.

2. A tool of the class described, comprising jaws, a chuck fitted to said jaws and adapted to grasp the inner ball-race of a generator or magneto bearing, a threaded shaft, and means for actuating such shaft and jaws for the purpose of removing such inner ball-race.

3. A tool of the class described, comprising jaws, a chuck divided into parts, means for holding said parts in relative position to form a single whole, means for causing said chuck to grasp a shouldered sprocket or bearing of a generator or magneto bearing, a threaded shaft, and means for actuating such shaft and jaws for the purpose of removing the object to be extracted.

4. A tool of the class described, comprising a threaded shaft, jaws actuated by means of said shaft, a chuck divided into sections and fitted to said jaws, recessed pins projecting from the edge of said chuck to be gripped by said jaws, pins between sections of said chuck fitted to corresponding holes in the opposite sections and engaging such pins, and means, with the aid of such pins, for holding said sections in relative position to each other.

HENRY N. TUGGLE.

Witnesses:
 WM. ROTH,
 FLORA WHITE.